(12) United States Patent
Kaiser et al.

(10) Patent No.: US 9,429,100 B2
(45) Date of Patent: Aug. 30, 2016

(54) COOLING DUCT PISTON AND METHOD FOR PRODUCING THE SAME

(75) Inventors: Timotheus Kaiser, Stuttgart (DE); Hermann Pfeifer, Essingen (DE); Wolfgang Rehm, Ulm (DE); Karl Weisskopf, Rudersburg (DE)

(73) Assignee: Daimler AG, Stuttgart (DE)

( * ) Notice: Subject to any disclaimer, the term of this patent is extended or adjusted under 35 U.S.C. 154(b) by 628 days.

(21) Appl. No.: 13/882,554

(22) PCT Filed: Sep. 24, 2011

(86) PCT No.: PCT/EP2011/004793
§ 371 (c)(1),
(2), (4) Date: Apr. 30, 2013

(87) PCT Pub. No.: WO2012/065661
PCT Pub. Date: May 24, 2012

(65) Prior Publication Data
US 2013/0213218 A1 Aug. 22, 2013

(30) Foreign Application Priority Data
Nov. 17, 2010 (DE) .................. 10 2010 051 681

(51) Int. Cl.
*B23P 17/00* (2006.01)
*F02F 3/22* (2006.01)
(Continued)

(52) U.S. Cl.
CPC .............. *F02F 3/22* (2013.01); *B22D 19/0027* (2013.01); *B23P 15/10* (2013.01); *F02F 3/003* (2013.01); *F02F 3/12* (2013.01); *F02F 3/285* (2013.01); *Y10T 29/49258* (2015.01)

(58) Field of Classification Search
CPC .............. F02F 3/003; F02F 3/20; F16J 1/01; F16J 1/006
USPC ............................................................ 29/888
See application file for complete search history.

(56) References Cited

U.S. PATENT DOCUMENTS

| 5,394,788 A | 3/1995 | Mendes et al. | |
|---|---|---|---|
| 2009/0178640 A1* | 7/2009 | Haug | F02F 3/26 123/193.6 |

(Continued)

FOREIGN PATENT DOCUMENTS

| DE | 1949581 A1 | 4/1971 |
|---|---|---|
| DE | 8217338 U1 | 10/1982 |

(Continued)

OTHER PUBLICATIONS

Office Action dated Apr. 4, 2014, in Japanese Application No. 2013-539148 (with English language translation).

*Primary Examiner* — Nathaniel Wiehe
*Assistant Examiner* — Daniel Collins
(74) *Attorney, Agent, or Firm* — Patent Central LLC; Stephan A. Pendorf

(57) ABSTRACT

A cooling duct piston (1) for combustion engines. The cooling duct piston has a piston basic body (2) that is connected to a lining part (3), which is facing an assigned combustion chamber. Here, the lining part (3) completely forms the piston surface (4) of the cooling duct piston (1) that faces the combustion chamber. An encircling depression (5) is provided in the surface of the piston basic body (2) facing the combustion chamber. The lining part (3) provides a permanent connection at least with the surface of the piston basic body (2) facing the combustion chamber, and thus bridges the encircling depression (5), such that the encircling depression (5), with the lining part (3) that bridges it, forms a cooling duct (6).

8 Claims, 2 Drawing Sheets

(51) Int. Cl.
*B22D 19/00* (2006.01)
*F02F 3/00* (2006.01)
*F02F 3/12* (2006.01)
*F02F 3/28* (2006.01)
*B23P 15/10* (2006.01)

(56) References Cited

U.S. PATENT DOCUMENTS

2010/0108017 A1* 5/2010 Bing .................. B23K 13/02
                                                      123/193.6
2012/0024255 A1    2/2012 Grahle et al.
2012/0174899 A1    7/2012 Haug

FOREIGN PATENT DOCUMENTS

| DE | 102007005268 A1 | 8/2007 |
| DE | 102007003679 A1 | 7/2008 |
| DE | 102009048124 A1 | 4/2011 |
| EP | 0640759 A1 | 3/1995 |
| EP | 1612395 A1 | 1/2006 |
| GB | 1044596 A | 10/1966 |
| JP | 52156123 U | 11/1977 |
| JP | 59172251 U | 11/1984 |
| JP | 4311654 A | 11/1992 |
| WO | 2009079988 A1 | 7/2009 |

* cited by examiner

COOLING DUCT PISTON AND METHOD FOR PRODUCING THE SAME

BACKGROUND OF THE INVENTION

1. Field of the Invention

The invention relates to a cooling duct piston and a method for producing the same from a piston basic body and a lining part.

2. Description of the Related Art

A cooling duct piston and its production is known from DE 10 2007 029 307 A1, for example, which describes a piston for a combustion engine with a piston basic body, which faces a further component that is connected permanently to an assigned combustion chamber. There, the further component completely forms the piston surface of the piston that faces the combustion chamber. In the piston basic body, a cooling duct that is completely enclosed by the material of this piston basic body is provided. Engine oil can circulate through this to cool the upper region of the piston.

In DE 10 2007 005 268 A1, it is specified as to the prior art how cooling ducts can be produced by a lost core. The lost core is arranged in such a mould that it can be completely encapsulated. Then the material of the lost core is discharged from the cooling duct formed, wherein it must be ensured that no material remains in the cooling duct, so as to prevent contaminants in the engine oil circuit. As an alternative to producing a cooling duct, an encircling depression is provided in a combustion chamber side of a piston basic body, which is sealed by a metal strip, for example. The design of the piston is hereby higher and the materials used must, on the one hand, be adjusted with respect to their thermal and mechanical properties to one another, and on the other hand the metal strip must be fitted to the piston basic body via the cooling duct on the combustion chamber side.

The subject matter of DE 10 2007 005 268 A1 is a multi-part steel piston consisting of a piston upper section and a piston lower section, wherein, in the region of the piston upper section, an annular element forms a coaxial and radially circumferential cooling duct with the piston upper section. The attachment regions of the annular element are set up at least once in sections and the annular element is attached permanently to the piston basic body, wherein at least one attachment point is located in the surface of the steel piston that faces the combustion chamber.

Based on the cited prior art, the object arises to provide an improved cooling duct piston that is constructed simply and robustly and is thereby cost-effective.

BRIEF SUMMARY OF THE INVENTION

This object is solved by the cooling duct piston having the features of claim 1.

A further object of the invention is to create a simplified and more efficient method for producing the improved cooling duct piston, wherein it is not necessary to provide and encapsulate a lost core to form the cooling duct.

Developments of the cooling duct piston and the production method thereof are embodied in the sub-claims.

In particular, the invention relates to a cooling duct piston for combustion engines with a piston basic body, which is connected to a lining part that faces an assigned combustion chamber, wherein the lining part forms the piston surface of the cooling duct piston that faces the combustion chamber. The cooling duct piston according to the invention is characterized in that an encircling depression is provided in the surface of the piston basic body facing the combustion chamber, wherein the lining part is at least permanently connected to the surface of the piston basic body faces the combustion chamber, and moreover bridges the encircling depression, such that a cooling duct is formed by the encircling depression and the lining part bridging it.

The cooling duct piston according to the invention is designed simply and robustly and it has no attachment point in the surface facing the combustion chamber, which is in particular stressed thermally and mechanically by the operating temperature of the piston. Furthermore, as regards its production, no lost core is required, such that there is no danger of solids of the lost core remaining in the complete cooling duct piston and contaminating the engine oil, for example.

It has proven to be advantageous if the fixed connection of the lining part is a cast joint, which is provided by at least partial moulding of the lining part into the piston basic body, or a material bond or a positive connection with the piston basic body, since a reliable and permanent and easy-to-produce connection can be achieved hereby. Depending on the material used for the lining part and the piston basic body, a suitable, fixed connection or a combination of several types of fixed connection can be selected, while a section of the lining body is moulded, for example, and, depending on the geometry of the cooling duct piston, a further lining part is reshaped and connected positively.

In a further development of the invention, the lining part forms a covering wall and at least one section of a side wall of the cooling duct and furthermore at least partially forms the external peripheral side of the piston basic body. It is hereby possible, with the lining part, to form the region of the external peripheral side that has in particular been thermally stressed, which is located closest to the combustion chamber.

Advantageously, in the section of the lining part that at least partially forms the external peripheral side of the piston basic body, at least one annular groove for a piston ring can be provided, so that a first piston ring can be provided in the region of the external peripheral side that has in particular been thermally stressed. In addition, the lining part that partially forms the external peripheral side of the piston basic body can be positively connected in this region.

In a further embodiment of the cooling duct piston, the material of the lining part has a higher level of heat conductivity than the material of the piston basic body, in order to dissipate the temperatures occurring on the combustion chamber side from the piston basic body. Here, the material of the lining part is a ferritic steel, aluminium, an aluminium alloy or a graphite material, preferably a graphite fibre mat, and the material of the piston basic body is an austenic steel, aluminium, an aluminium alloy, titanium, a titanium alloy, a cast iron, a graphite material or a composite material. The graphite fibre mat that is preferred as the material of the lining part is in particular used as heat insulation for the piston basic body.

Due to the suitable selection of the material pairing of lining part and piston basic body, a cooling duct piston can be provided that is suitable for different temperature ranges and scopes. Suitable material pairings are, for example: Lining part made from ferritic steel/piston basic body made from austenic steel, lining part made from ferritic steel/piston basic body made from aluminium, lining part and piston basic body made from aluminium.

A preferred material for the piston basic body is an austenic steel stabilised with Ni, Mn, N, which has a thermal expansion coefficient in a region of 16 to $21 \times 10^{-6}$ $K^{-1}$. In particular, the austenic steel is a Fe—Cr—Ni austenite with a composition containing 0.2 to 0.4% b.w. C, 8 to 18% b.w. Ni, 15 to 26% b.w. Cr, 0.5 to 2% b.w. Si, up to 12% b.w. Mn, up to 2% b.w. W, up to 2% b.w. Nb, up to 2% b.w. Al, 0.05 to 0.3% b.w. N and Fe with a proportion corresponding to a differential proportion for retaining 100% b.w. of the steel alloy.

Due to the defined thermal expansion coefficient of the austentic steel, this austenite is particularly suitable for use as a material for the piston basic body according to the invention if the lining part consists of aluminium. Additionally, a piston basic body made from the described austentic steel is particularly suitable for use in cylinder liners made from aluminium.

The invention furthermore relates to a method for producing a cooling duct piston of the type described above. This comprises the following steps:

providing a fixed connection at least between the surface of a piston basic body that faces a combustion chamber, in which an encircling depression is provided, and a lining part, and bridging the encircling depression and thus forming a cooling duct through the encircling depression and the lining part that bridges this.

According to the method according to the invention, it is not necessary to provide a lost core for the production of a cooling duct in a piston. In fact, even during the production of the piston basic body, for example by die-casting, the encircling depression can be inserted into the side facing the combustion chamber. This encircling depression can be bridged by the lining part, such that the cooling duct is formed in a simple manner.

In a development of the method, this comprises the step of connecting the lining part to the piston basic body by partially moulding the lining part into the piston basic body, connecting the lining part to the piston basic body as a material bond and/or connecting the lining part to the piston basic body positively.

According to one embodiment of the method, the method comprises the following steps:

inserting the lining part into a cavity of a mould for a piston basic body, wherein the shape of the cavity has a negative form for the encircling depression and the negative form is kept free from the lining part, filling the mould with the material for the piston basic body, thereby at least partially moulding the lining part, cooling and demoulding the piston basic body with the moulded lining part, and reshaping at least one non-moulded section of the lining part, thereby bridging the encircling depression and forming the cooling duct.

An important advantage of this embodiment is that the lining part already forms a fixed connection from moulding with the piston basic body. At the same time, the encircling depression is provided for the cooling duct by a negative form in the mould. After the cooling and demoulding, the encircling depression can thus be closed off in a simple manner by bridging to a cooling duct with the lining part, without providing a lost core or suchlike.

In a further embodiment of the method according to the invention, after the bridging of the encircling depression, at least one further non-moulded section of the lining part is reshaped and brought against the external peripheral side, such that the lining part forms a covering wall and at least one section of a side wall of the cooling duct and the lining part at least partially forms the external peripheral side of the piston basic body. This specialised embodiment provides the advantage that the lining part is first moulded with the piston basic body and thus provides a fixed connection, such that the lining part can be kept secure and can be reliably reshaped again, wherein the bridging of the encircling depression is achieved.

This and other advantages are demonstrated by the description below with reference to the accompanying figures. The reference to the figures in the description serves to support the same and to facilitate understanding of the subject matter. The figures are only a schematic depiction of a preferred embodiment of the invention.

BRIEF DESCRIPTION OF THE SEVERAL VIEWS OF THE DRAWINGS

Here are shown.

DETAILED DESCRIPTION OF THE INVENTION

Figure 1:
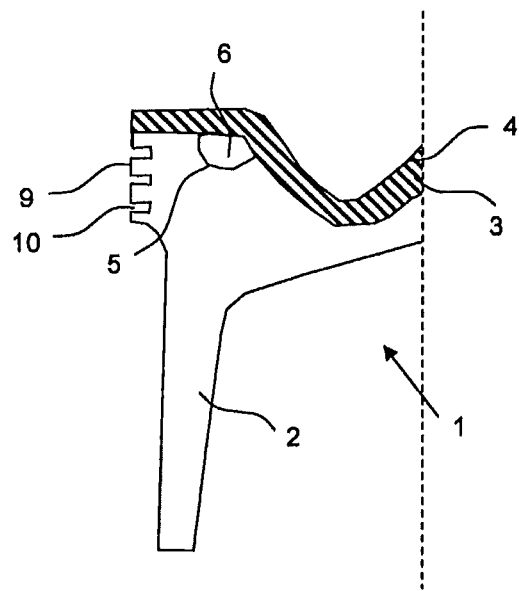
FIG. 1a sectional view of a cooling duct piston according to the invention according to a first embodiment, FIGS. 2a, 2b and 2c sectional views of steps of a production method according to the invention for a cooling duct piston.

The cooling duct piston 1 depicted in FIG. 1 has a piston basic body 2. A depression 5 is applied on the side facing the combustion chamber of the combustion engine and annular grooves 10 for piston rings are provided on the external peripheral side 9. The side of the piston basic body 2 facing the combustion chamber is covered by the lining part 3 over its entire face, which forms the piston surface 4 of the cooling duct piston 1 facing the combustion chamber, and which bridges the depression 5 in order to form the cooling duct 6. The lining part 3 can be a strip made from ferritic steel or aluminium or a graphite fibre mat.

The piston basic body 2 is made from austentic steel, aluminium or an aluminium alloy, titanium or a titanium alloy, cast iron, graphite or a composite material as casting or die-casting or has been produced by forging.

It has proven to be technically advantageous if a lining part 3 made from ferritic steel is connected to a piston basic body 2 made from austentic steel, since the ferritic steel has a higher level of heat conductivity and thus the temperatures occurring on the combustion chamber side are dissipated by the austentic steel of the piston basic body 2.

A further advantageous combination is a lining part 3 made from ferritic steel, which has a good level of heat conductivity and a piston basic body 2 made from aluminium, which shows a high expansion coefficient. With respect to aspects of manufacturing, a lining part 3 made from aluminium on a piston basic body 2, which is also made from aluminium, can be advantageous, since no difference in terms of thermal expansion coefficients have to be compensated for here.

A particularly preferred material for the piston basic body 2 is an Fe—Cr—Ni austenite with a composition containing 0.2 to 0.4% b.w. C, 8 to 18% b.w. Ni, 15 to 26% b.w. Cr, 0.5 to 2% b.w. Si, up to 12% b.w. Mn, up to 2% b.w. W, up to 2% b.w. Nb, up to 2% b.w. Al, 0.05 to 0.3% b.w. N and an Fe radical (to retain 100% b.w.) with the accompanying elements that are typical for steel. This austenite has a thermal expansion coefficient of between 16 and $21 \times 10^{-6}$ $K^{-1}$ and is thus in particular suitable as a material for the piston basic body 2, if the lining part consists of aluminium.

In light of the prevailing temperatures in the combustion chamber of the combustion engine, it is advantageous if the material of the lining part 3 has a higher level of heat conductivity than the material of the piston basic body 2 in order to dissipate temperatures occurring on the combustion engine side from the piston basic body 2; furthermore, the proposed material of the lining part 3 shows good thermal consistency with respect to corrosion and fatigue properties for the temperature range prevailing in the combustion chamber of the combustion engine.

Figure 2A:
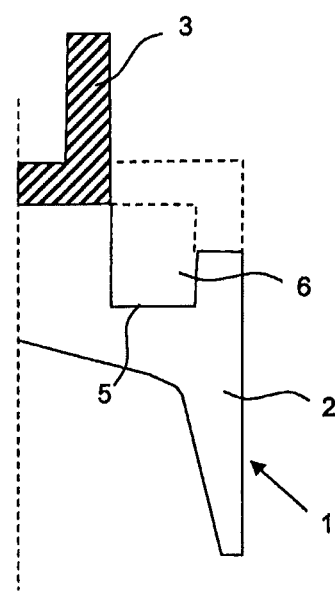
Figure 2B:
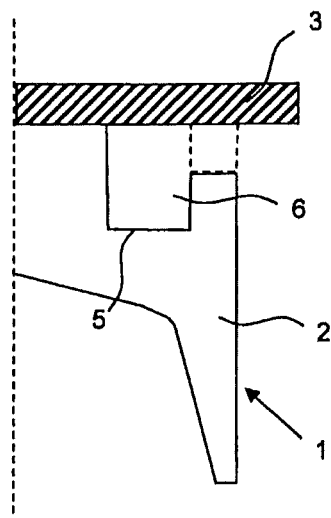
Figure 2C:
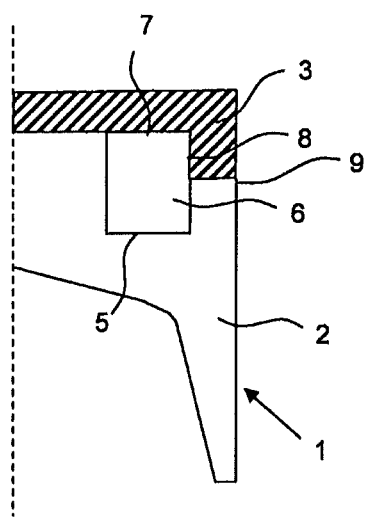

Whereas FIG. 1 shows a preferred embodiment wherein the surface of the cooling duct piston 1 facing the combustion chamber is formed completely by the lining part 3, FIG. 2c depicts a further embodiment of the invention, wherein a part of the external peripheral side 9 is also formed by the lining part 3.

To produce the cooling duct piston 1, a pre-fabricated lining part 3, for example a curved strip, is inserted into a mould for the cooling duct piston 1, which furthermore has a negative form in order to produce an encircling depression 5 in the piston basic body 2. Then the material for the piston basic body 2 is poured into the mould, wherein the previously inserted lining part 3 is moulded, and wherein a fixed, material bonded connection is formed at the contact surface between the lining part 3 and the piston basic body 2.

Alternatively to this, is it possible, after the lining part 3 has been moulded, to fuse this at its connecting joint to the piston basic body 2, for example by an annular joint, or to provide individual fusing points between the lining part 3 and the piston basic body 2.

As well as the fusing alluded to above, which is preferable embodied as friction welding, laser welding or induction welding, a fixed connection is also possible by soldering. Likewise, the fixed connection can take place by pressing or force-fitting the lining part 3, wherein pressed or force-fit undercuts, or those produced by reshaping, enable the fixed connection.

After the fixed connection between the lining part 3 and the piston basic body 2, the non-moulded section of the lining part 3 is reshaped onto the encircling depression 5. As is to be gleaned schematically from the method step between FIGS. 2a and 2b, this can happen by bending, such that the lining part 3 forms at least the covering wall 7 of the cooling duct 6.

In the method step that is embodied to arrive at the subject matter shown in FIG. 2c from that shown in FIG. 2b, a further, non-moulded section of the lining part 3 is additionally curved in the direction of the piston basic body 2 in such a way that the lining part 3 forms the covering wall 7 and one part of the side wall 8 of the cooling duct 6 and thus one part of the external peripheral side 9 of the piston basic body 2. The cooling duct 6 is now closed without the necessity of a lost core.

Whereas, in the prior art, a lost core is provided and assembled in the mould and removed again after the casting of the piston body, the production method according to the invention represents a clear simplification. Additionally, a robust piston is produced, which has no attachment point such as a welded joint in its combustion chamber site, which is in particular stressed mechanically and thermally for the prevailing operating temperatures and can be a predetermined breaking point of the piston.

From the simple and robust construction of the cooling duct piston 1 according to the invention, particularly low production costs for the individual cooling duct piston 1 and reduced operating costs for the combustion engine, in which this is applied, arise.

In the figures, it is not explicitly depicted that, in the embodiment as is shown in FIG. 2c, at least one annular groove can be provided for a piston ring in the section of the lining part 3, which forms one part of the external peripheral side 9 of the piston basic body 2. This annular groove can already be formed in the lining part 3 that is to be inserted into the mould or can be inserted after the production of the cooling duct piston 1 has been completed.

The invention claimed is:

1. A cooling duct piston (1) for combustion engines, having a piston basic body (2) that is connected to a lining part (3), which lining part (3) faces an assigned combustion chamber,
    wherein the lining part (3) completely forms the piston surface (4) of the cooling duct piston (1) facing the combustion chamber,
    wherein an encircling depression (5) is provided in the surface of the piston basic body (2) facing the combustion chamber,
    wherein the lining part (3) provides a permanent connection at least to the surface of the piston basic body (2) facing the combustion chamber, thereby bridging the encircling depression (5), such that the circling depression (5), with the lining part (3) that bridges it, forms a cooling duct (6), and
    wherein the material of the lining part (3) has a higher level of heat conductivity than the material of the piston basic body (2) and is a ferritic steel, aluminium, or an aluminium alloy and the material of the piston basic body (2) is a Fe—Cr—Ni austentic steel.

2. The cooling duct piston (1) according to claim 1, wherein the permanent connection is a cast joint, which is provided by at least partial moulding of the lining part (3) into the piston basic body (2), or a material bond or a positive connection.

3. The cooling duct piston (1) according to claim 2, wherein the lining part (3) at least partially forms the external peripheral side (9) of the piston basic body (2) and at least one annular groove for a piston ring is provided in this section of the lining part (3).

4. A cooling duct piston (1) for combustion engines, having a piston basic body (2) that is connected to a lining part (3), which lining part (3) faces an assigned combustion chamber,
    wherein the lining part (3) completely forms the piston surface (4) of the cooling duct piston (1) facing the combustion chamber,
    wherein an encircling depression (5) is provided in the surface of the piston basic body (2) facing the combustion chamber,
    wherein the lining part (3) provides a permanent connection at least to the surface of the piston basic body (2) facing the combustion chamber, thereby bridging the encircling depression (5), such that the circling depression (5), with the lining part (3) that bridges it, forms a cooling duct (6),
    wherein the material of the lining part (3) has a higher level of heat conductivity than the material of the piston basic body (2) and is a ferritic steel, aluminium, or an aluminium alloy and the material of the piston basic body (2) is an austentic steel, and
    wherein the material of the piston basic body (2) is an austentic steel stabilised with Ni, Mn, N, which has a thermal expansion coefficient in a range from 6 to $21 \times 10^{-6}$ $K^{-1}$.

5. The cooling piston (1) according to claim 4, wherein the austentic steel is an Fe—Cr—Ni austenite with a composition containing
    0.2 to 0.4% b.w. C,
    8 to 18% b.w. Ni, 15 to 26% b.w. Cr,
0.5 to 2% b.w. Si,
up to 12% b.w. Mn,
up to 2% b.w. W,
up to 2% b.w. Nb,
up to 2% b.w. Al
0.05 to 0.3% b.w. N and
Fe balance of the steel alloy.

6. A method for the production of a cooling duct piston (1) for combustion engines, having a piston basic body (2) that is connected to a lining part (3), which lining part (3) faces an assigned combustion chamber, wherein the lining part (3) completely forms the piston surface (4) of the cooling duct piston (1) facing the combustion chamber, wherein an encircling depression (5) is provided in the surface of the piston basic body (2) facing the combustion chamber, wherein the lining part (3) provides a permanent connection at least to the surface of the piston basic body (2) facing the combustion chamber, thereby bridging the encircling depression (5), such that the circling depression (5), with the lining part (3) that bridges it, forms a cooling duct (6), and wherein the material of the lining part (3) has a higher level of heat conductivity than the material of the piston basic body (2) and is a ferritic steel, aluminium, or an aluminium alloy and the material of the piston basic body (2) is an austentic steel, the method comprising the following steps:

inserting the lining part (3) into a cavity of a mould for a piston basic body (2), wherein the shape of the cavity has a negative form for the encircling depression (5) and the negative form is kept free from the lining part (3), filling the mould with the material for the piston basic body (2), thereby at least partially moulding the lining part (3), cooling and demoulding the piston basic body (2) with the moulded lining part (3), and reshaping at least one non-moulded section of the lining part (3), thereby bridging the encircling depression (5) and forming the cooling duct (6).

7. The method according to claim 6, further comprising the following step:

after the bridging of the encircling depression (5), reshaping at least one further non-moulded section of the lining part (3) and thus providing a positive engagement at the external peripheral side (9), whereby a covering wall (7) and at least one section of a side wall (8) of the cooling duct (6) are formed by the lining part (3) and at least one part of the external peripheral side (9) of the piston basic body (2) is formed by the lining part (3).

8. The cooling duct piston (1) according to claim 1, wherein the material of the lining part (3) is aluminium, or an aluminium alloy.

* * * * *